(12) United States Patent
Wu et al.

(10) Patent No.: US 9,601,989 B2
(45) Date of Patent: Mar. 21, 2017

(54) INTELLIGENT PULSE CONTROL CIRCUIT

(71) Applicants: LITE-ON ELECTRONICS (GUANGZHOU) LIMITED, Guangzhou (CN); LITE-ON TECHNOLOGY CORPORATION, Taipei (TW)

(72) Inventors: Chi-Che Wu, Taipei (TW); Tsan Chen, Taoyuan (TW); Yun-Chieh Hsu, New Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 77 days.

(21) Appl. No.: 14/816,128

(22) Filed: Aug. 3, 2015

(65) Prior Publication Data

US 2016/0329806 A1 Nov. 10, 2016

(30) Foreign Application Priority Data

May 8, 2015 (CN) .......................... 2015 1 0232637

(51) Int. Cl.
*H02M 1/42* (2007.01)
*H02M 1/00* (2006.01)

(52) U.S. Cl.
CPC .... *H02M 1/4208* (2013.01); *H02M 2001/007* (2013.01); *H02M 2001/0032* (2013.01)

(58) Field of Classification Search
CPC ........ H02M 1/08; H02M 1/42; H02M 1/4208; H02M 1/4216; H02M 1/4225; H02M 1/4233; H02M 1/4241; H02M 1/425; H02M 1/4258; H02M 7/217; H02M 7/2176
USPC ..................................................... 363/78, 89
See application file for complete search history.

(56) References Cited

U.S. PATENT DOCUMENTS

| 5,019,717 A * | 5/1991 | McCurry ................... G06F 1/28 307/66 |
| 7,903,439 B2 * | 3/2011 | Oettinger .............. H02M 3/157 323/283 |
| 9,450,496 B2 * | 9/2016 | Sigamani .......... H02M 3/33546 |
| 2009/0141521 A1 * | 6/2009 | Yang .................. H02M 3/33592 363/49 |
| 2009/0316454 A1 * | 12/2009 | Colbeck .............. H02M 1/4225 363/89 |

(Continued)

*Primary Examiner* — Jeffrey Sterrett
(74) *Attorney, Agent, or Firm* — Li & Cai Intellectual Property (USA) Office

(57) ABSTRACT

The instant disclosure provides an intelligent pulse control circuit used for a power supply. The intelligent pulse control circuit comprises a control unit, a buffer unit, a comparing unit and a switch unit. The buffer receives a loading signal. The comparing unit is coupled to the buffer unit, receives the loading signal generated according to the current of the output loading, and compares the loading signal and the feedback signal to generate a control signal. The switch unit is controlled by the control signal of the comparing unit to provide a turn-off signal. When the output loading is light load, the switch unit controls the control unit to disable the PFC stage and the PWM stage according to the turn-off signal. Accordingly, the intelligent pulse control circuit can reduce the power consumption when the output loading is light load.

12 Claims, 8 Drawing Sheets

(56) References Cited

U.S. PATENT DOCUMENTS

2014/0177301 A1* 6/2014 Kim ................... H02M 7/23
                                                                       363/84
2016/0329806 A1* 11/2016 Wu .................... H02M 1/4208

* cited by examiner

INTELLIGENT PULSE CONTROL CIRCUIT

BACKGROUND OF THE INVENTION

1. Field of the Invention

The instant disclosure relates to a power supply; in particular, to an intelligent pulse control circuit used for a power supply.

2. Description of Related Art

Please refer to FIG. 1 showing a system block diagram of a conventional power supply. The conventional power supply 1 comprises a rectifier/filter circuit 11, a power factor correction stage 12, a pulse width modulation stage 13 and a standby output stage 14. When the power is turned on, the main output voltage Vo (+12V/+5V/+3.3/−12V for example) of the power supply 1 is provided to the load for operation. In standby status, the standby output stage 14 outputs a standby voltage Vo'.

Performance convert consumption would happen during the process of providing voltage to the load. Accordingly, every country has developed rules or criterion to restrict the problem of energy waste due to the performance convert consumption. The 80 PLUS® program developed by Ecos Consulting and the ENERGY STAR® program developed by US Environmental Protection Agency are the most widely used criterion. The 80 PLUS® program is a voluntary certification program by Ecos Consulting representing public utilities and energy saving organizations in Unites States. It certifies power supplies for computers and servers that have more than 80% energy efficiency at 20%, 50% and 100% of rated load in AC/DC conversion. In the year 2008, standards revised to add Bronze, Silver, and Gold higher efficiency level certifications of 80 PLUS® were provided. Ecos Consulting further added a specification for Platinum efficiency level in October 2009, and a Titanium certification in August 2011, wherein the Titanium specification defines more than 90% energy efficiency at 10% loading. It can be seen that power conversion efficiency has become the most important evaluation index. As for the ENERGY STAR® of the United States, the latest version 6.0, released by October 2013, points out the efficiency about 81% to 84% at 10% loading. However, in this very light load condition, the regular power loss (comprising switching loss of the semiconductor power switch, iron loss of the magnetic element, copper loss, and so on) is the majority of the total power loss. This is the main reason why the efficiency of the power supply cannot be increased in very light load.

SUMMARY OF THE INVENTION

The object of the instant disclosure is to provide an intelligent pulse control circuit, for improving the present power supply architecture, in order to meet the power saving requirement in light load operation mode.

In order to achieve the aforementioned objects, according to an embodiment of the instant disclosure, an intelligent pulse control circuit used for a power supply is provided. The power supply has a power factor correction stage and a pulse width modulation stage. The power factor correction stage is coupled to the pulse-with modulation stage. The pulse width modulation stage generates a loading signal according to the current of an output load. The voltage outputted from the power factor correction stage to the pulse width modulation stage is a feedback signal. The intelligent pulse control circuit comprises a control unit, a buffer unit, a comparing unit and a switch unit. The control unit is coupled to the power factor correction stage and the pulse width modulation stage. The buffer unit receives the loading signal. The comparing unit is coupled to the buffer unit. The comparing unit receives the loading signal through the buffer unit, and compares the loading signal and the feedback signal to generate a control signal. The switch unit is coupled to the comparing unit and the control unit. The switch unit is controlled by the control signal of the comparing unit to provide a turn-off signal. When the output loading is light load, the switch unit controls the control unit to disable the power factor correction stage and the pulse width modulation stage according to the turn-off signal.

In summary, an intelligent pulse control circuit is provided. The intelligent pulse control circuit detects the loading signal feedback from the pulse width modulation stage and the feedback signal of the output voltage of the power factor correction stage, and compares the loading signal and the feedback signal, for controlling the power factor correction stage and the pulse width modulation stage, so as to reduce switching of the transistors of the power factor correction stage and the pulse width modulation stage. Therefore, the purpose of reducing the switching loss of related switches can be achieved.

In order to further the understanding regarding the instant disclosure, the following embodiments are provided along with illustrations to facilitate the disclosure of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

An Embodiment of an Intelligent Pulse Control Circuit

Figure 1:
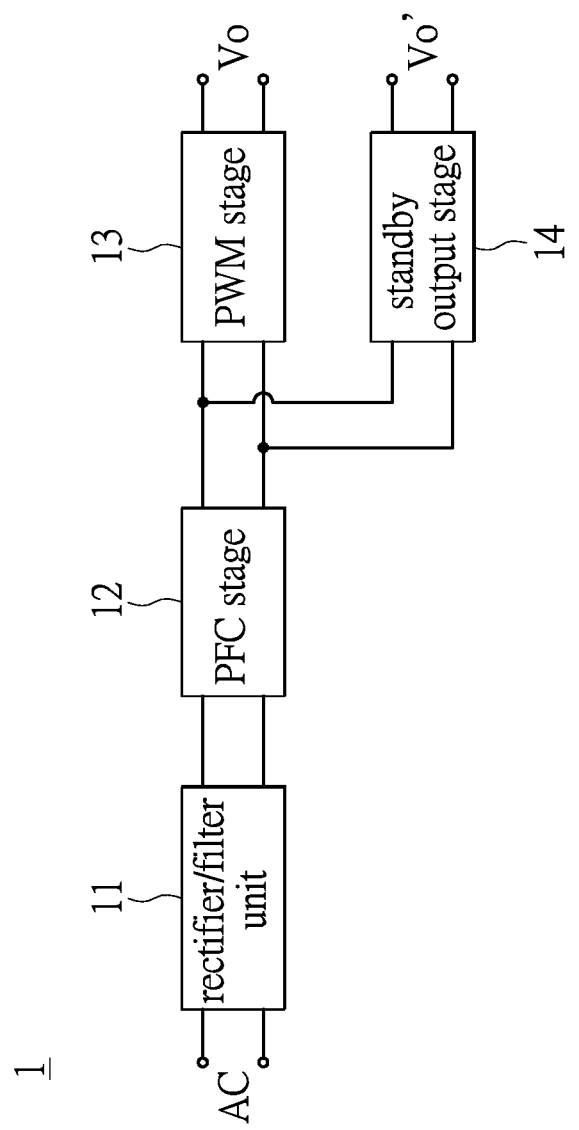
FIG. 1 shows a system block diagram of a conventional power supply.
Figure 2:
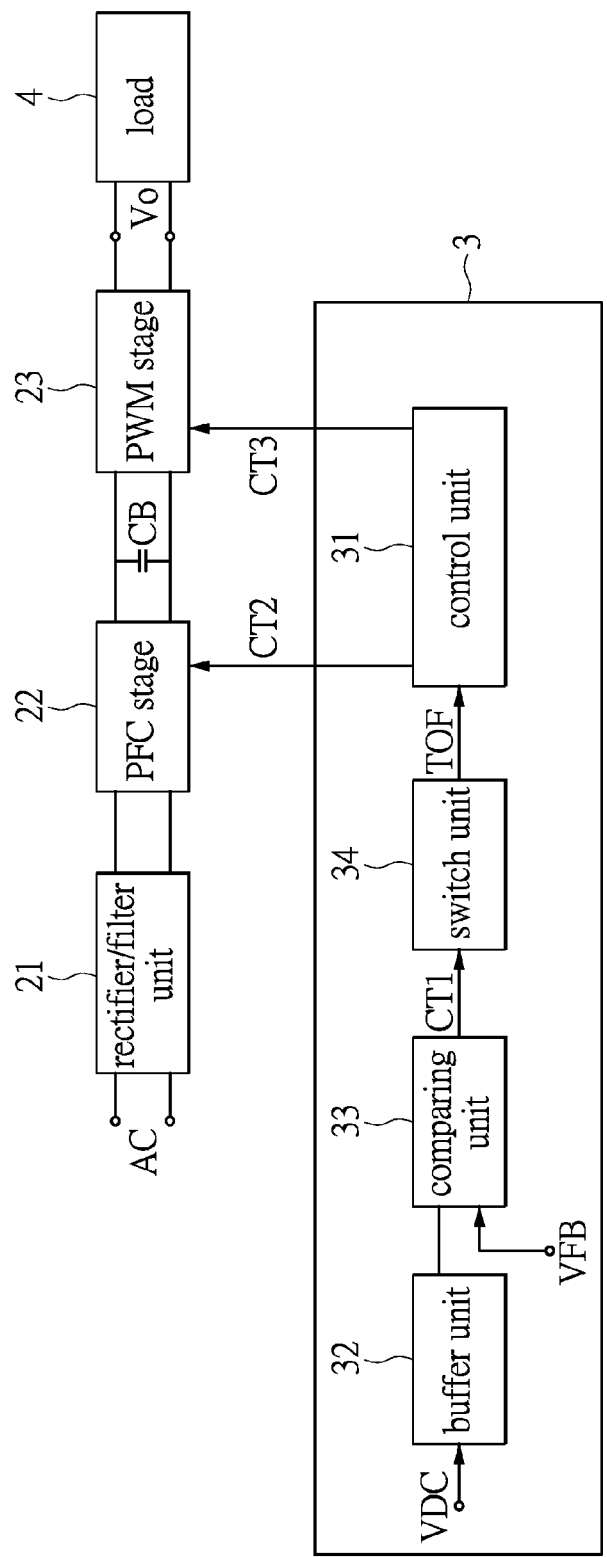
FIG. 2 shows a architecture diagram of an intelligent pulse control circuit according to an embodiment of the instant disclosure.

Please refer to FIG. 2 showing an architecture diagram of an intelligent pulse control circuit according to an embodiment of the instant disclosure. The intelligent pulse control circuit is used for a power supply. The power supply usually has a rectifier/filter unit 21, a power factor correction (PFC) stage 22 and a pulse width modulation (PWM) stage 23. The rectifier/filter unit 21 rectifies and filters the input alternating current power AC. The rectifier/filter unit 21 is coupled to the power factor correction stage 22. The power factor correction stage 22 is coupled to the pulse-with modulation stage 23. The pulse width modulation stage 23 provides electrical power to the output loading which can be the load 4 shown in FIG. 2. The rectifier/filter unit 21 rectifies and filters the input alternative current power AC, and the power factor correction stage 22 corrects the output power to improve the power output efficiency. The pulse width modulation stage 23 usually adjusts the power output to the load 4 by using a feedback mechanism for the output voltage/current.

In FIG. 2, the power factor correction stage 22 and the pulse width modulation stage 23 are controlled by the intelligent pulse control circuit 3. The intelligent pulse control circuit 3 generates a power factor correction control signal CT2 for controlling the power factor correction stage 22. The intelligent pulse control circuit 3 generates a pulse width modulation signal CT3 for controlling the pulse width modulation stage 23. The knowledge of the rectifier/filter unit 21, the power factor correction stage 22 and the pulse width modulation stage 23 are well known in the related art, thus there is no need to go into detail.

The pulse width modulation stage 23 generates a loading signal VDC according to the current output to the load 4. The voltage outputted from the power factor correction stage 22 to the pulse width modulation stage 23 is a feedback signal VFB. The voltage outputted from the power factor correction stage 22 to the pulse width modulation stage 23 can be represented by a voltage across the capacitor CB shown in FIG. 3.

The intelligent pulse control circuit 3 comprises a control unit 31, a buffer unit 32 a comparing unit 33 and a switch unit 34. The control unit 31 is coupled to the power factor correction stage 22 and the pulse width modulation stage 23. The buffer unit 32 receives the loading signal VDC. The comparing unit 33 is coupled to the buffer unit 32. The comparing unit 33 receives the loading signal VDC through the buffer unit 32, and compares the loading signal VDC and the feedback signal VFB to generate a control signal CT1. The switch unit 34 is coupled to the comparing unit 33 and the control unit 31. The switch unit 34 is controlled by the control signal CT1 of the comparing unit 33 to provide a turn-off signal TOF. When the output loading is light load, the switch unit 34 controls the control unit 31 to disable the power factor correction stage 22 and the pulse width modulation stage 23 according to the turn-off signal TOF. There are a variety of methods for disabling the power factor correction stage 22 and the pulse width modulation stage 23. An exemplary embodiment is described in the following.

Firstly, regarding the loading signal VDC generated by the pulse width modulation stage 23, the loading signal VDC is usually represented in voltage, and the voltage level may vary due to different output loading status. The loading signal VDC can be obtained by using a feedback circuit connected to the output terminal of the pulse width modulation stage 23. The heavier the output loading is, the higher the voltage level of the loading signal VDC. When the output loading is decreased the voltage of the loading signal VDC will be lower.

Figure 3:
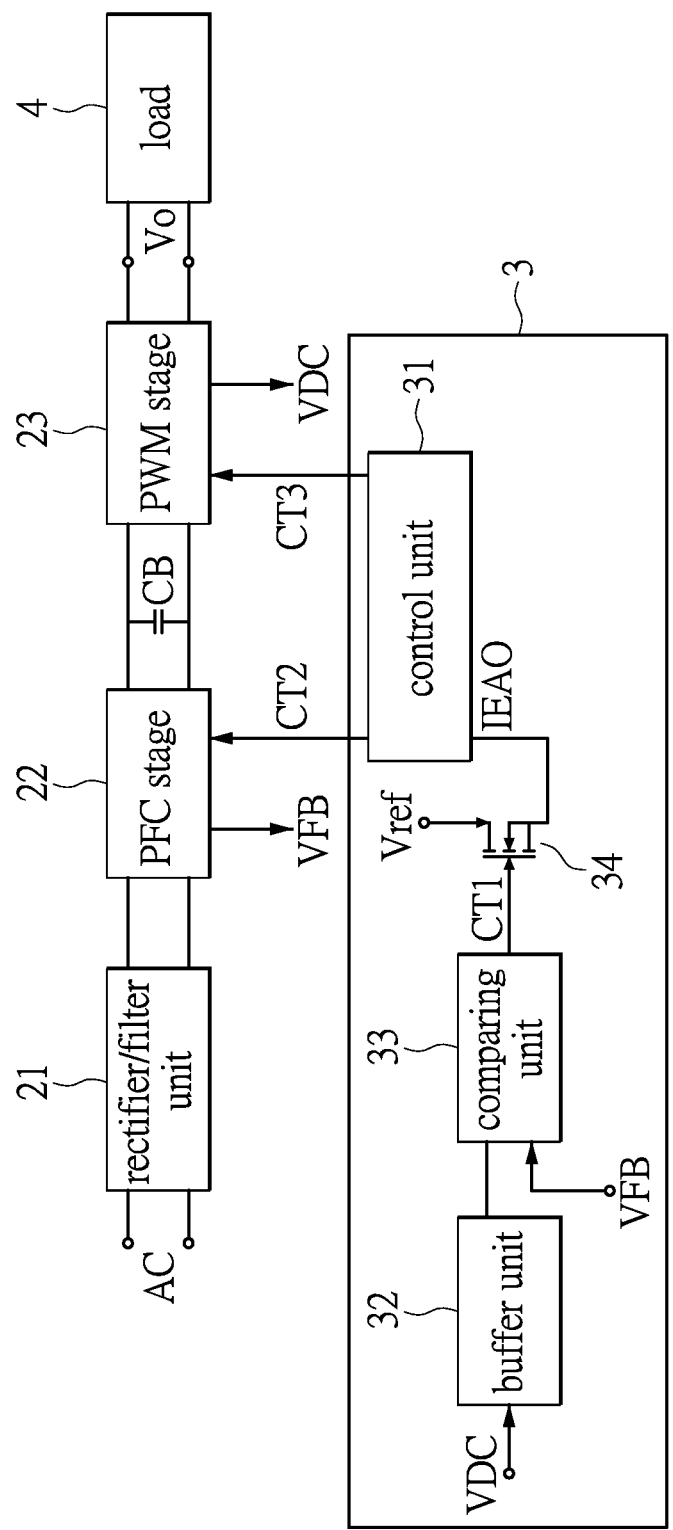
FIG. 3 shows a circuit diagram of an intelligent pulse control circuit according to an embodiment of the instant disclosure.

Based on the architecture shown FIG. 2, FIG. 3 shows a circuit diagram of an intelligent pulse control circuit according to an embodiment of the instant disclosure. In FIG. 3, the switch unit 34 is connected to a reference signal Vref to be the turn-off signal TOF shown in FIG. 2. The switch unit 34 transmits the reference signal Vref to a control terminal IEAO of the control unit 31 when the output loading is light load. The switch unit 34 does not transmit the turn-off signal Vref to the control unit 31 when the output loading is heavy load. The switch unit 34 can comprise at least one transistor for conducting the reference signal Vref. The reference signal Vref can be a constant voltage when the circuit has already started. For example, the reference signal Vref can be a high voltage level. The reference signal Vref can be generated by the control unit 31 for example. In other embodiments, the reference signal Vref can be replaced by another voltage which will be described in the subsequent embodiment hereinafter.

In practical applications, the control unit 31 usually is implemented by an integrated circuit (IC). In one embodiment, the pulse width modulation stage 23 provides the feedback (the dividing voltage of the output voltage Vo or the loading signal VDC for example) of the output loading to the control circuit 31, and then the buffer unit 32 receives the loading signal VDC through the control unit 31, but the instant disclosure is not restricted thereto. Similarly, the feedback signal VFB generated by the power factor correction stage 22 can be transmitted to the control unit 31 first, and then the control unit 31 transmits the feedback signal VFB to the comparing unit 33, but the instant disclosure is not so restricted.

Figure 4:
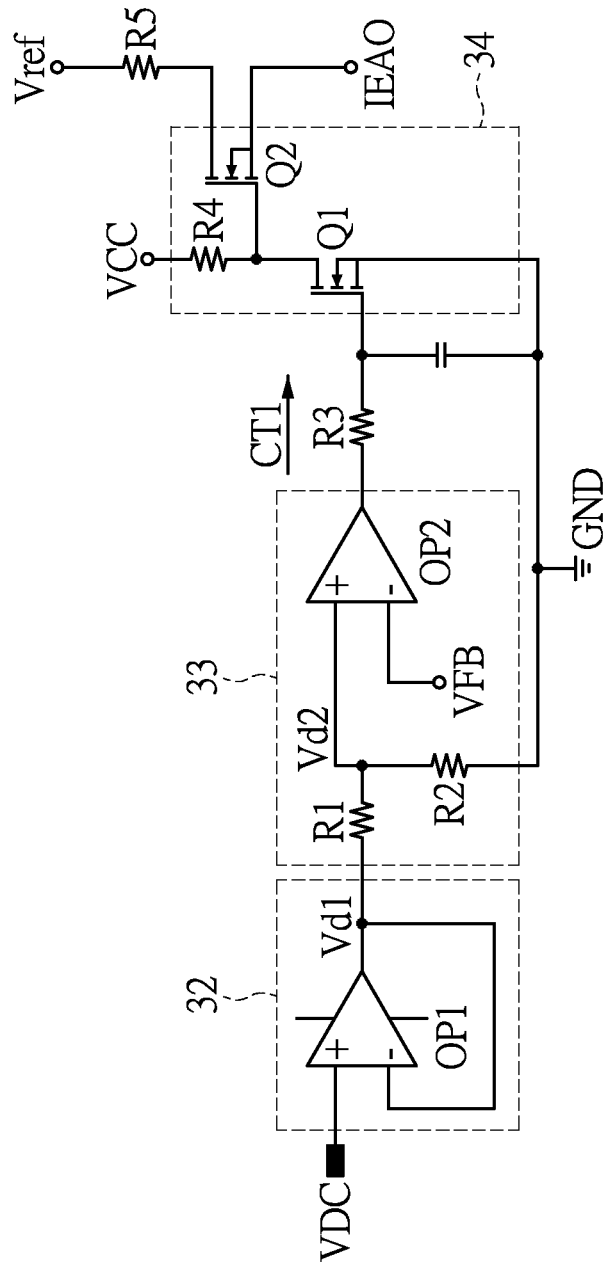
FIG. 4 shows a detailed circuit diagram of the intelligent pulse control circuit of FIG. 3.

An exemplary detailed embodiment of the buffer unit 32, the comparing unit 33 and the switch unit 34 of FIG. 2 and FIG. 3 are shown in FIG. 4. In FIG. 4, the buffer 32 is a unit gain amplifier (which is implemented by an operational amplifier OP1) for converting the loading signal VDC to a voltage Vd1. The comparing unit 33 is implemented by an operational amplifier OP2, wherein the operational amplifier OP2 has a non-inverted input terminal (+), an inverted input terminal (−) and an output terminal. The non-inverted input terminal (+) of the operational amplifier OP2 receives a voltage VD2, wherein resistors R1 and R2 divide the voltage Vd1 to obtain a voltage Vd2. The voltage Vd2 is equivalent to the loading signal VDC in circuit principle, but the absolute values of the voltage Vd2 and the loading signal VDC are not the same. In other words, the non-inverted input terminal (+) of the operational amplifier OP2 is coupled to the buffer 32 for receiving the loading signal VDC (which is presented in the form of the voltage Vd2). The inverted input terminal (−) of the operational amplifier OP2 receives the feedback signal VFB and the output terminal generates the control signal CT1.

The switch unit 34 comprises a first transistor Q1 and a second transistor Q2. The first transistor Q1 and the second transistor Q2 can be metal-oxide-semiconductor field-effect transistors (MOSFET). For example, the first transistor Q1 and the second transistor Q2 are the n-channel MOSFETs, but the instant embodiment is not so restricted. A control terminal (gate) of the first transistor Q1 is coupled to the output terminal of the operational amplifier OP2 for receiving the control signal CT1, and a first terminal of the first transistor Q1 is coupled to a ground GND. A control terminal (gate) of the second transistor Q2 is coupled to a second terminal of the first transistor Q1 and a bias voltage Vcc. A first terminal of the second transistor Q2 is coupled to a control terminal IEAO of the control unit 31. A second terminal of the second transistor Q2 receives the reference signal Vref. In FIG. 4, resistors R3, R4, R5 usually used for adjusting the input/output resistance are not necessary elements of this embodiment, thus there is no need to go into detail.

Regarding the operation of the circuit in FIG. 4, it can be divided into two situations, including light load and heavy load. When the output loading is heavy load, the voltage level of Vd2 is higher than VFB, and the output terminal of the operational amplifier OP2 would be at a high voltage level which conducts the first transistor Q1 to cause cut-off status of the second transistor Q2. At the same time, the voltage of the control terminal IEAO of the control unit 31 would not be affected by the voltage signal of Vref. In one embodiment, the control terminal IEAO is a pin of the PFC transconductance current error amplifier for controlling the integrated circuit of the power factor correction stage 22. In other words, the output signal of gate-source for the power factor correction stage 22 is normal at this time, and there is no switching operation in order to maintain the normal output of the power supply.

When the output loading is light load, the voltage level Vd2 is lower than VFB, and the output terminal of the operational amplifier OP2 would be at a low voltage level which cuts off the first transistor Q1 to cause conduction status of the second transistor Q2. At the same time, the voltage of the control terminal IEAO of the control unit 31 would be pull-up to the voltage level of the reference signal Vref. In other words, due to the high voltage level of the control terminal IEAO, the output signal of the gate-source of the power factor correction stage 22 would cause the transistor of the power factor correction stage 22 to be turned-off. Therefore, the pulse width modulation stage 23 would not be in operation. That is, all of the power factor correction stage 22 and the pulse width modulation stage 23 would not output a signal (regarded as being disabled), and the necessary regular power loss can be reduced to a minimum.

In short, when the output loading is light load the control signal CT1 cuts off the first transistor Q1, and then the second transistor Q2 is conducted due to the bias voltage Vcc to conduct the first terminal and the second terminal of the second transistor Q2 with each other. When the output loading is heavy load the control signal CT1 conducts the first transistor Q1, and then the second transistor Q2 is cut-off to non-conduct the first terminal and the second terminal of the second transistor Q2 with each other. Accordingly, switching of the first transistor Q1 and the second transistor Q2 realizes the function of the switch unit 34 shown in FIG. 3.

Figure 5A:
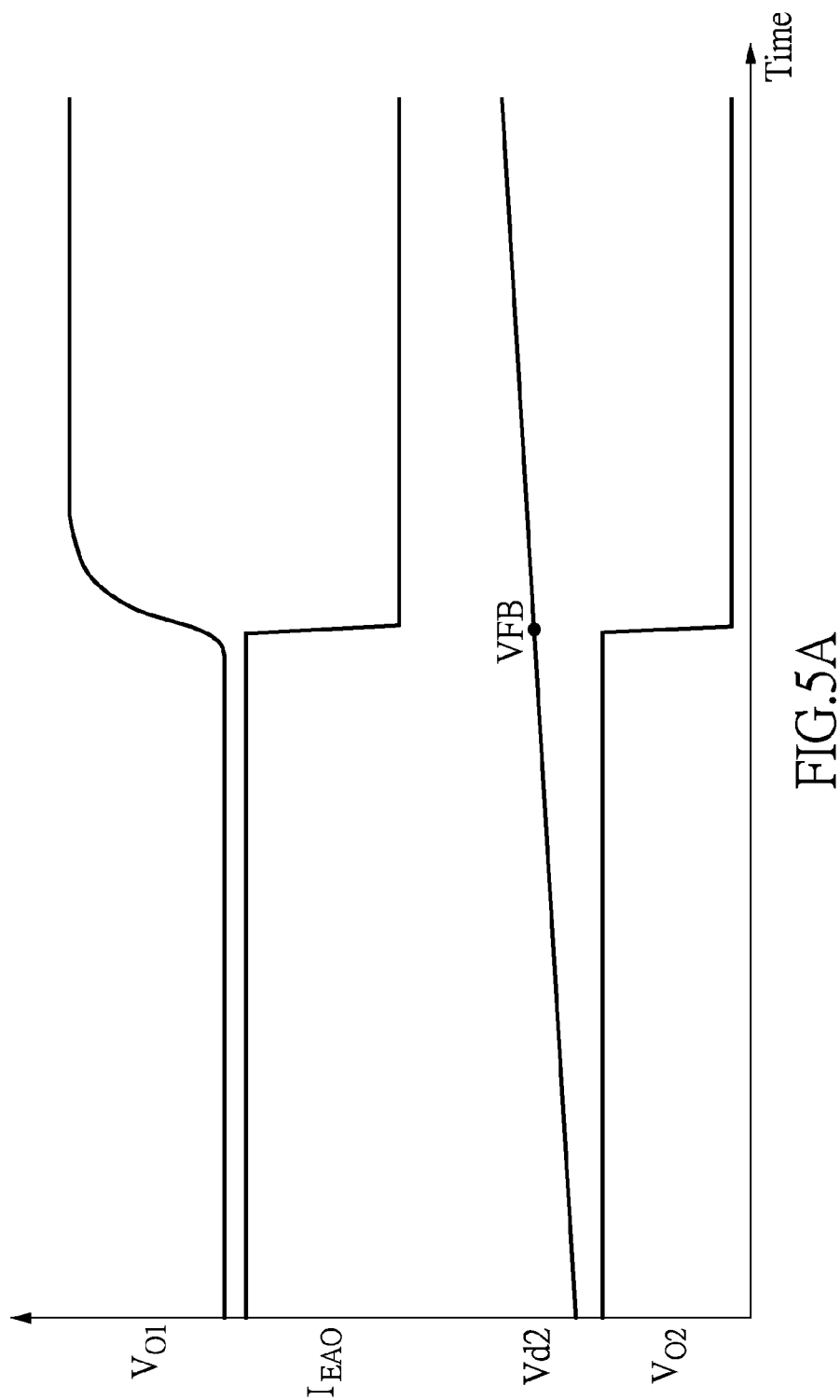
FIG. 5A shows a waveform diagram of the intelligent pulse control circuit of FIG. 4 when the output loading changes from light load to heavy load.
Figure 5B:
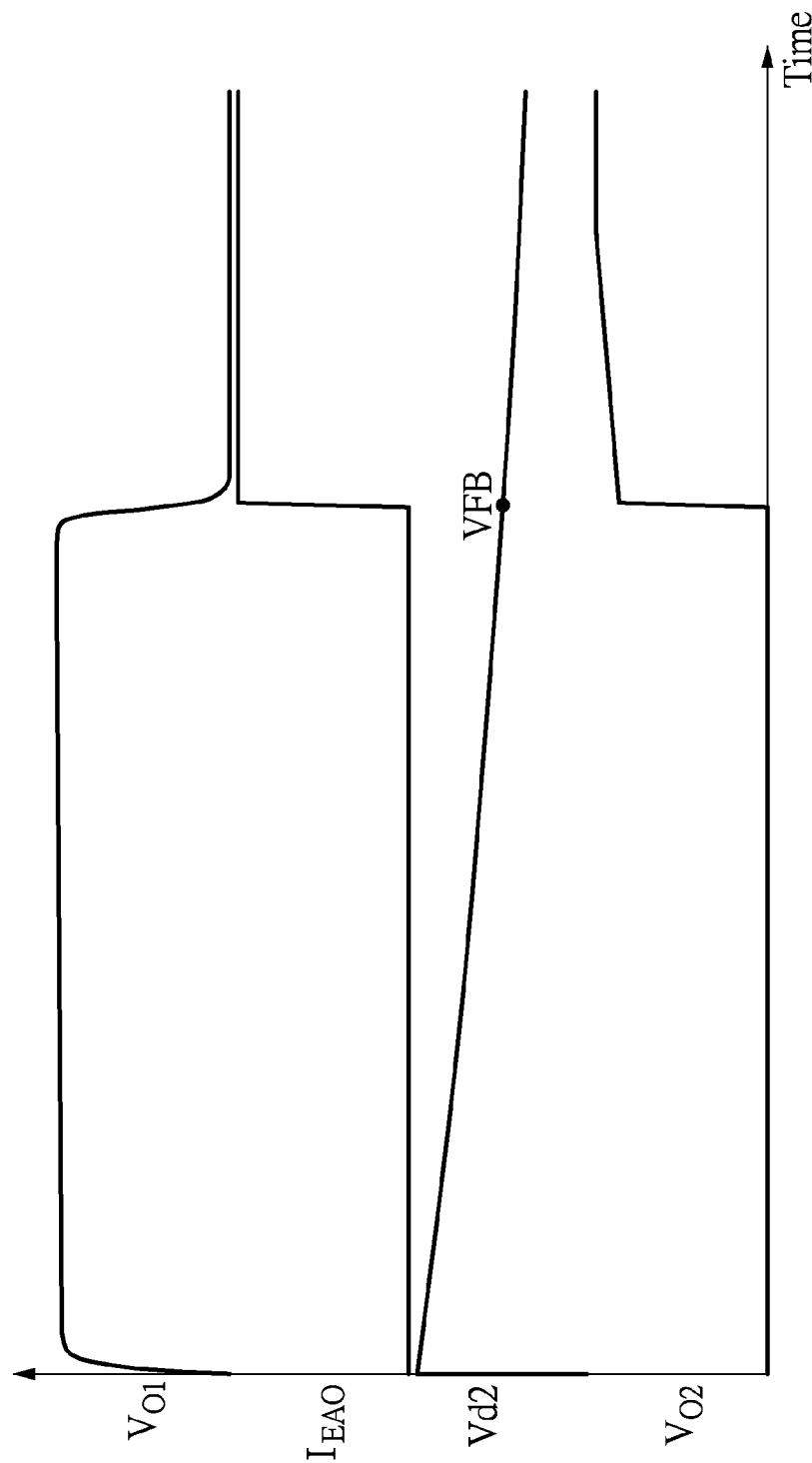
FIG. 5B shows a waveform diagram of the intelligent pulse control circuit of FIG. 4 when the output loading changes from heavy load to light load.

Please refer to FIG. 4 in conjunction with FIG. 5A and FIG. 5B. FIG. 5A shows a waveform diagram of the intelligent pulse control circuit of FIG. 4 when the output loading changes from light load to heavy load, FIG. 5B shows a waveform diagram of the intelligent pulse control circuit of FIG. 4 when the output loading changes from heavy load to light load. As shown in FIG. 5A, during the process of the output loading changing from light load to heavy load, the voltage Vd2 increases gradually. When the voltage Vd2 is greater than the feedback signal VFB, the first transistor Q1 is conducted (gate voltage VQ1 of the first transistor Q1 increases), the second transistor Q2 is cut-off (gate voltage VQ2 of the second transistor Q2 is close to voltage level of ground), and the voltage of the control terminal IEAO recovers from high voltage level (which is Vref in the circuit shown in FIG. 4) to low voltage level. The control terminal IEAO can have a low voltage level when the control terminal IEAO does not receive external pull-high voltage (reference voltage Vref for example) due to the design for the inner circuit of the control unit 31. Furthermore, as shown in FIG. 5B, during the process of the output loading changing from heavy load to light load, the voltage Vd2 decreases gradually. When the voltage Vd2 is lower than the feedback signal VFB, the first transistor Q1 is cut-off (gate voltage VQ1 of the first transistor Q1 is changed to zero), the second transistor Q2 is conducted (gate voltage VQ2 of the second transistor Q2 is changed to the high voltage level Vcc), and the voltage of the control terminal IEAO changes from low voltage level to high voltage level, that is the voltage of the control terminal IEAO changes to the voltage level of the reference signal Vref.

Furthermore, when the second transistor Q2 is conducted, the control unit 31 turns off the power factor correction stage 22 and the pulse width modulation stage 23 according to the reference signal Vref, such that the output voltage of the pulse width modulation stage 23 would be decreased. When decreasing of the output voltage of the pulse width modulation stage 23 causes the feedback signal VFB to be lower than the loading signal VDC, the control signal CT1 conducts the first transistor Q1, in order to cut off the second transistor Q2 again. That is, the output voltage of the pulse width modulation stage 23 corresponds to the loading signal VDC. When the loading signal VDC is greater than the feedback signal VFB, the intelligent pulse control circuit automatically returns to original status, that is not transmitting the reference signal Vref to the control terminal IEAO of the control unit 31.

In another embodiment, when the control unit 31 can be realized in an integrated circuit, the loading signal VDC can be replaced by a voltage of the control terminal VEAO of the PFC transconductance voltage error amplifier. The voltage of the control terminal VEAO of the PFC transconductance voltage error amplifier and the loading signal VDC both respond to the magnitude of the current of the output loading.

Figure 6:
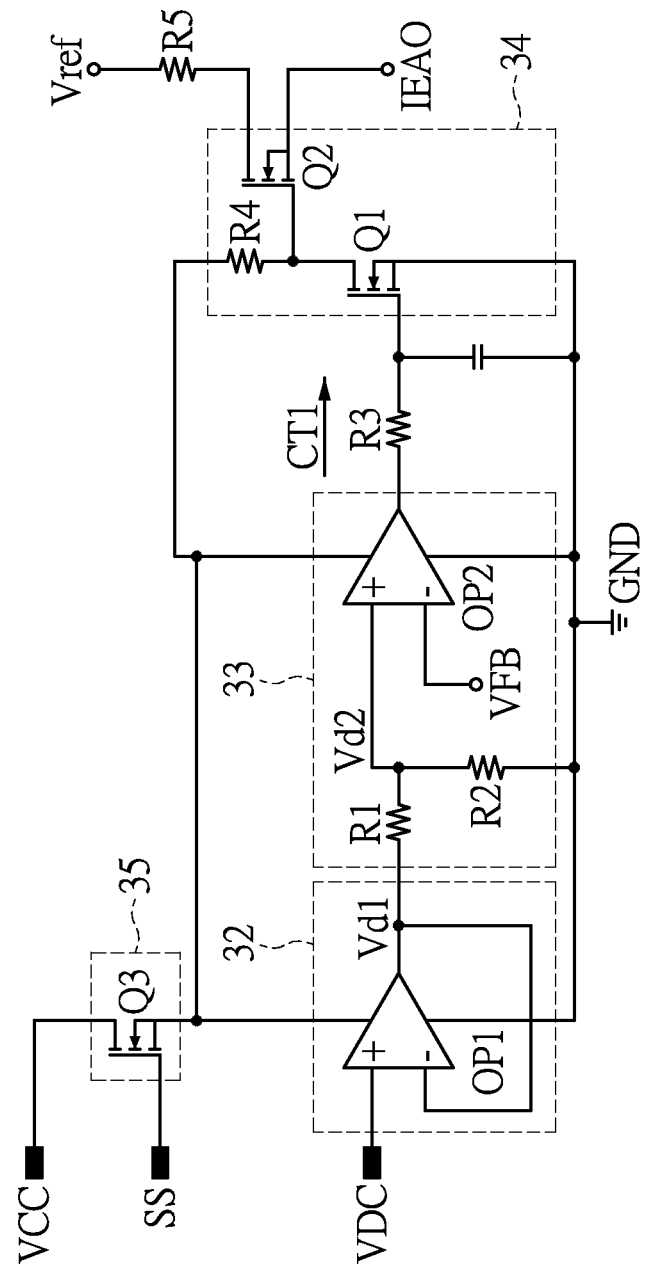
FIG. 6 shows a circuit diagram of an intelligent pulse control circuit according to another embodiment of the instant disclosure.

Please refer to FIG. 4 in conjunction with FIG. 6. The circuit in FIG. 4 can provide the normal operation of the intelligent pulse control circuit of the instant disclosure. However, when the circuit is just started, the circuit may abnormally switch due to the voltage being unstable. The circuit shown in FIG. 6 is the circuit of FIG. 4 cooperating with a start unit, such that the intelligent pulse control circuit can realize a soft start. In FIG. 6, the start unit is implemented by a transistor Q3. The start unit 35 is coupled between the control terminal (gate) of the second transistor Q2 and the bias voltage Vcc. The start unit 35 is controlled by a start signal SS of the control unit 31. According to ordinary design, the control unit 31 realized in the integrated circuit can generate a start signal SS (usually presented in the form of voltage) in it when the integrated circuit has been started and has operated stably. When the control terminal (gate) of the start unit 35 receives the start signal SS, the start unit 35 transmits the bias voltage Vcc to the control terminal (gate) of the second transistor Q2. In the same way, the input power source Vcc can conduct the transistor Q3 to establish the power source of the operational amplifier OP1, OP2.

The intelligent pulse control circuit is verified by adding the intelligent pulse control circuit to a 180 W power supply in mass production. Table 1 indicates the real test results when the intelligent pulse control circuit is not added. The following table 2 indicates the real test results when the intelligent pulse control circuit is added. It can be seen that the efficiency is increased by 1.35%-3.24% when introducing the intelligent circuit, based on the criterion of input power should not exceed 10 W when the output power is 6

W. The efficiency can be increased by 1.1% to 1.51% for the criterion in 10% loading (ENERGY STAR® requirement). It can be understood that by realizing the intelligent pulse control circuit, lower regular switching electrical power loss can be achieved, and the relevant efficiency criterion can be met.

the control signal CT1 cuts off the first transistor Q1, and then the second transistor Q2 would be conducted due to the bias voltage Vcc, such that the first terminal and the second terminal of the second transistor Q2 are conducted with each other. Therefore, the pulse width modulation signal PWM can be pulled down to the voltage level of the ground GND.

TABLE 1

Conventional 180 W power supply operating in 10% loading, output power is 6 W, Vi is input voltage, Ii is input current, Pi is input power, Io is output power, Vo is output voltage, Po is output power, η is efficiency.

| Conventional power supply | | | 12 V output | | −12 V output | | Standby 5 V | | | |
|---|---|---|---|---|---|---|---|---|---|---|
| Vi (V) | Ii (A) | Pi (W) | Io (A) | Vo (V) | Io (A) | Vo (V) | Io (A) | Vo (V) | Po (W) | η (%) |
| 115 V/ | 0.2224 | 23.25 | 1.3934 | 12.117 | 0.0193 | 11.8635 | 0.189 | 5.1389 | 18.08 | 77.78% |
| 60 Hz | 0.1157 | 10.07 | 0.364 | 12.116 | 0 | 0 | 0.3114 | 5.1407 | 6.01 | 59.69% |
| 230 V/ | 0.1569 | 23.23 | 1.3902 | 12.117 | 0.0193 | 11.865 | 0.19 | 5.1447 | 18.05 | 77.71% |
| 50 Hz | 0.1031 | 10.23 | 0.363 | 12.116 | 0 | 0 | 0.3113 | 5.1467 | 6.00 | 58.65% |

TABLE 2

Power supply having the intelligent pulse control circuit operating in 10% loading, output power is 6 W, Vi is input voltage, Ii is input current, Pi is input power, Io is output power, Vo is output voltage, Po is output power, η is efficiency.

| Power supply having the intelligent pulse control circuit | | | 12 V output | | −12 V output | | Standby 5 V | | | |
|---|---|---|---|---|---|---|---|---|---|---|
| Vi (V) | Ii (A) | Pi (W) | Io (A) | Vo (V) | Io (A) | Vo (V) | Io (A) | Vo (V) | Po (W) | η (%) |
| 115 V/ | 0.2976 | 23.01 | 1.401 | 12.112 | 0.0193 | 11.704 | 0.1897 | 5.0288 | 18.15 | 78.87% |
| 60 Hz | 0.148 | 9.961 | 0.37 | 12.115 | 0 | 0 | 0.3178 | 5.0277 | 6.08 | 61.04% |
| 230 V/ | 0.2073 | 22.91 | 1.401 | 12.112 | 0.0193 | 11.7052 | 0.1897 | 5.0289 | 18.15 | 79.22% |
| 50 Hz | 0.1331 | 9.784 | 0.368 | 12.116 | 0 | 0 | 0.3176 | 5.0277 | 6.06 | 61.89% |

An Embodiment of an Intelligent Pulse Control Circuit

Figure 7:
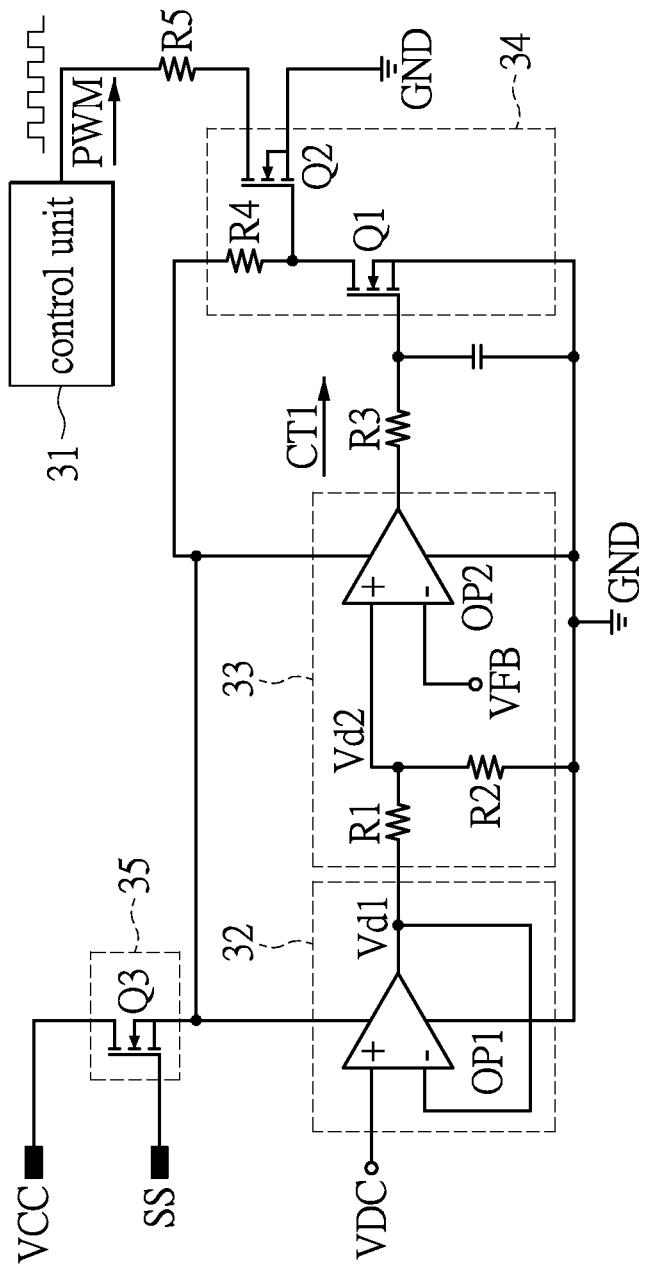
FIG. 7 shows a circuit diagram of an intelligent pulse control circuit according to another embodiment of the instant disclosure.

Please refer to FIG. 7 showing a circuit diagram of an intelligent pulse control circuit according to another embodiment of the instant disclosure. The circuit in FIG. 7 is significantly identical to the circuit shown in FIG. 6 except for the connection manner of the second transistor Q2. That is, this embodiment changes the connection between the switch unit 34 and the control unit 31 in FIG. 3. However, the circuit in FIG. 7 still complies with the architecture shown in FIG. 2. The switch unit 34 is controlled by the control signal CT1 of the comparing unit 33 for providing the turn-off signal TOF to the control unit 31. The switch unit 34 comprises the first transistor Q1 and the second transistor Q2. The control terminal (gate) of the first transistor Q1 is coupled to the output terminal of the operational amplifier OP2, for receiving the control signal CT1. The first terminal of the transistor Q1 is coupled to the ground GND. The control terminal (gate) of the second transistor Q2 is coupled to the second terminal of the first transistor Q1 and the bias voltage Vcc. The first terminal of the second transistor Q2 is coupled to the ground GND. The second terminal of the second transistor Q2 receives the pulse width modulation signal PWM provided by the control unit 31. The pulse width modulation signal PWM is the pulse width modulation signal CT3 for controlling the pulse width modulation stage 23. When the output loading is light load, That is, the control signal (PWM) received by the pulse width modulation stage 23 is always at low voltage level, such that the pulse width modulation stage 23 can be considered as being disabled. In this embodiment, the ground voltage level (GND) coupling with the first terminal of the second transistor Q2 can be considered as the turn-off signal TOF. In the same way, the power factor correction stage 22 can be set to be disabled based on the same manner.

In short, the control unit 31 controls the pulse width modulation signal PWM of the pulse width modulation stage 23. When the output loading is light load, the switch unit 34 makes the pulse width modulation signal PWM be coupled with the ground GND, such that the pulse width modulation signal PWM is always at low voltage level.

When the output loading is heavy load, the control signal CT1 conducts the first transistor Q1, and then the second transistor Q2 is cut-off, such that the first terminal and the second terminal of the second transistor Q2 are not conducted with each other. Therefore, the pulse width modulation signal PWM would not be affected by the second transistor Q2, and the pulse width modulation signal PWM can perform the normal operation.

According to above descriptions, the intelligent pulse control circuit provided in the instant disclosure is a high efficiency, low loss intelligent pulse control circuit. By implementation of the intelligent pulse control circuit, the electrical power loss of the system in light load can be reduced. Therefore, the provided circuit can meet modern energy saving criterion for improving the product competitiveness.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. An intelligent pulse control circuit used for a power supply, the power supply having a power factor correction stage and a pulse width modulation stage, the power factor correction stage coupled to the pulse-with modulation stage, the pulse width modulation stage generating a loading signal according to the current of an output loading, the voltage outputted from the power factor correction stage to the pulse width modulation stage being a feedback signal, the intelligent pulse control circuit comprising:
 a control unit, coupled to the power factor correction stage and the pulse width modulation stage;
 a buffer unit, receiving the loading signal;
 a comparing unit, coupled to the buffer unit, receiving the loading signal through the buffer unit, and comparing the loading signal and the feedback signal to generate a control signal; and
 a switch unit, coupled to the comparing unit and the control unit, controlled by the control signal of the comparing unit to provide a turn-off signal, wherein when the output loading is light load, the switch unit controls the control unit to disable the power factor correction stage and the pulse width modulation stage according to the turn-off signal.

2. The intelligent pulse control circuit according to claim 1, wherein the switch unit transmits the turn-off signal to the control unit when the output loading is light load, the switch unit does not transmit the turn-off signal to the control unit when the output loading is heavy load.

3. The intelligent pulse control circuit according to claim 1, wherein the turn-off signal is a pulse width modulation signal for controlling the pulse width modulation stage by the control unit, when the output loading is light load the switch unit couples the pulse width modulation signal to a ground, such that the pulse width modulation signal is at a low voltage level.

4. The intelligent pulse control circuit according to claim 1, wherein the loading signal is presented in voltage, wherein the heaver the output loading is, the higher the voltage level of the loading signal is, wherein the lighter the output loading is, the lower the voltage of the loading signal is.

5. The intelligent pulse control circuit according to claim 1, wherein the buffer is a unit gain amplifier.

6. The intelligent pulse control circuit according to claim 1, wherein the comparing unit comprises:
 an operational amplifier, having a non-inverted input terminal, an inverted input terminal and an output terminal, the non-inverted input terminal of the operational amplifier coupled to the buffer for receiving the loading signal, the inverted input terminal receiving the feedback signal, the output terminal generating the control signal.

7. The intelligent pulse control circuit according to claim 6, wherein the switch unit comprises:
 a first transistor, a control terminal of the first transistor coupled to the output terminal of the operational amplifier for receiving the control signal, a first terminal of the first transistor coupled to a ground; and
 a second transistor, a control terminal of the second transistor coupled to a second terminal of the first transistor and a bias voltage, a first terminal of the second transistor coupled to the control unit, a second terminal of the second transistor receiving the turn-off signal.

8. The intelligent pulse control circuit according to claim 7, wherein when the output loading is light load the control signal cuts off the first transistor, and then the second transistor is conducted due to the bias voltage for conducting the first terminal and the second terminal of the second transistor with each other; when the output loading is heavy load the control signal conducts the first transistor, and then the second transistor is cut-off for not conducting the first terminal and the second terminal of the second transistor with each other.

9. The intelligent pulse control circuit according to claim 8, wherein when the second transistor is conducted the control unit turns off the power factor correction stage and the pulse width modulation stage according to the turn-off signal, such that the output voltage of the pulse width modulation stage is decreased, when the output voltage of the pulse width modulation stage is decreased to make the feedback be lower than the loading signal, the control signal conducts the first transistor for cutting off the second transistor.

10. The intelligent pulse control circuit according to claim 7, further comprising:
 a start unit, coupled between the control terminal of the second transistor and the bias voltage, the start unit controlled by a start signal of the control unit, the start unit transmitting the bias voltage to the control terminal of the second transistor when a control terminal of the start unit receives the start signal.

11. The intelligent pulse control circuit according to claim 7, wherein the turn-off signal is a high voltage level.

12. The intelligent pulse control circuit according to claim 6, wherein the switch unit comprises:
 a first transistor, a control terminal of the first transistor coupled to the output terminal of the operational amplifier for receiving the control signal, a first terminal of the first transistor coupled to a ground; and
 a second transistor, a control terminal of the second transistor coupled to a second terminal of the first transistor and a bias voltage, a first terminal of the second transistor coupled to the ground, a second terminal of the second transistor receiving the pulse width modulation signal.

* * * * *